United States Patent
Gogolla et al.

(10) Patent No.: US 10,816,645 B2
(45) Date of Patent: *Oct. 27, 2020

(54) DEVICE FOR OPTICALLY MEASURING THE DISTANCE FROM A REFLECTIVE TARGET OBJECT

(71) Applicant: Hilti Aktiengesellschaft, Schaan (LI)

(72) Inventors: Torsten Gogolla, Schaan (LI); Andreas Winter, Feldkirch (AT)

(73) Assignee: Hilti Aktiengesellschaft, Schaan (LI)

( * ) Notice: Subject to any disclaimer, the term of this patent is extended or adjusted under 35 U.S.C. 154(b) by 401 days.

This patent is subject to a terminal disclaimer.

(21) Appl. No.: 15/575,237

(22) PCT Filed: May 11, 2016

(86) PCT No.: PCT/EP2016/060494
§ 371 (c)(1),
(2) Date: Nov. 17, 2017

(87) PCT Pub. No.: WO2016/184735
PCT Pub. Date: Nov. 24, 2016

(65) Prior Publication Data
US 2018/0136315 A1    May 17, 2018

(30) Foreign Application Priority Data
May 18, 2015 (EP) .................................. 15167963

(51) Int. Cl.
*G01S 7/48* (2006.01)
*G01S 7/481* (2006.01)
*G01S 17/08* (2006.01)

(52) U.S. Cl.
CPC ............ *G01S 7/4814* (2013.01); *G01S 17/08* (2013.01)

(58) Field of Classification Search
CPC .. G01C 3/08; G01P 3/36; G01B 11/14; G01L 3011/14
See application file for complete search history.

(56) References Cited

U.S. PATENT DOCUMENTS

| 6,411,371 B1 | 6/2002 | Hinderling et al. |
| 6,545,749 B1 * | 4/2003 | Andersson .............. G01S 17/10 356/5.01 |

(Continued)

FOREIGN PATENT DOCUMENTS

| DE | 197 27 988 A1 | 1/1998 |
| DE | 198 40 049 A1 | 4/2000 |

(Continued)

OTHER PUBLICATIONS

Kipp A. Bauchert, et al, High-speed multi-level 512x512 spatial light modulator, XP055221651, Mar. 31, 2000, http://bnonlinear.com, (Seven (7) pages).

(Continued)

*Primary Examiner* — Luke D Ratcliffe
(74) *Attorney, Agent, or Firm* — Crowell & Moring LLP

(57) ABSTRACT

A device for optically measuring the distance from a reflective target object is disclosed. The device includes a beam source, a detector, a beam shaping system having an optical transmission system and an optical receiving system, and a laser beam shaping element that can be arranged in the path of the laser beam. The laser beam shaping element is designed as a transmission aperture array with a first array of transmission pixels, where the transmission pixels are switchable by a first control unit between a transmission state impermeable to the laser beam and a transmission state at least partially permeable to the laser beam.

10 Claims, 5 Drawing Sheets

(56) References Cited

U.S. PATENT DOCUMENTS

| | | | |
|---|---|---|---|
| 7,177,015 | B2 | 2/2007 | Ohtomo et al. |
| 2004/0125357 | A1 | 7/2004 | Ohtomo et al. |
| 2006/0227317 | A1* | 10/2006 | Henderson ............ G01B 11/026 356/28 |
| 2010/0182587 | A1 | 7/2010 | Fluckiger |
| 2012/0038903 | A1* | 2/2012 | Weimer .................... G01C 3/08 356/4.07 |
| 2013/0016338 | A1* | 1/2013 | Bridges .............. G01B 11/2527 356/51 |
| 2016/0054446 | A1 | 2/2016 | Winter et al. |

FOREIGN PATENT DOCUMENTS

| | | |
|---|---|---|
| DE | 102 50 583 A1 | 5/2003 |
| DE | 10 2013 205 589 A1 | 10/2014 |
| JP | 1-272457 A | 10/1989 |
| JP | 8-129064 A | 5/1996 |
| JP | 2000-88566 A | 3/2000 |
| JP | 2001-208845 A | 8/2001 |
| JP | 2004-212059 A | 7/2004 |
| JP | 2006-47079 A | 2/2006 |
| JP | 2007-298372 A | 11/2007 |
| JP | 2010-96574 A | 4/2010 |
| JP | 2010-127918 A | 6/2010 |

OTHER PUBLICATIONS

PCT/EP2016/060494, International Search Report dated Jun. 30, 2016, (Three (3) pages).

European Search Report issued in corresponding EP patent application 15167963.6-1812 dated Oct. 26, 2015, (Nine (9) pages).

U.S. Patent Application, "Device for Optically Measuring the Distance from a Reflective Target Object", filed Nov. 17, 2017, Inventor: Torsten Gogolla et al.

* cited by examiner

DEVICE FOR OPTICALLY MEASURING THE DISTANCE FROM A REFLECTIVE TARGET OBJECT

This application claims the priority of International Application No. PCT/EP2016/060494, filed May 11, 2016, and European Patent Document No. 15167963.6, filed May 18, 2015, the disclosures of which are expressly incorporated by reference herein.

BACKGROUND AND SUMMARY OF THE INVENTION

The present invention relates to a device for optically measuring the distance from a reflective target object.

DE 197 27 988 A1 discloses a known device for optically measuring the distance from a reflective target object consisting of a telescope, a distance measuring device, and an adjustment device for adjusting the laser beam divergence. The distance measuring device comprises a beam source which emits a laser beam, a detector which receives a reception beam reflected on the target object, and a beam shaping system comprising a transmission optical system for beam shaping of the laser beam and a reception optical system for beam shaping of the reception beam. The laser beam divergence can be changed via the exit angle of the laser beam at the beam source, via the optical path length between the beam source and the transmission optical system or by an additional transmission optical system behind the beam source. A disadvantage is that all the measures proposed to adjust the laser beam divergence take place within the distance measuring device and reduce the stability of the distance measuring device.

From DE 198 40 049 A1 is known a device for optically measuring the distance from a reflective target object. The device comprises a distance measuring device and an adjustment device for adjusting the laser beam to the target object. The distance measuring device comprises one or two beam sources, a detector, and a beam shaping system with a transmission optical system and a reception optical system. The one or two beam sources generate a first laser beam having a large beam divergence and a second laser beam having a small beam divergence, wherein the first laser beam is provided for measuring the distance to the scattering target objects and the second laser beam is provided for measuring the distance to the reflective target objects.

The selection of a suitable laser beam can be made at the radiation sources or the detector. In one embodiment, the first and second laser beams are sent at the same time and hit the target. In the beam path of the reception beam optical filters are disposed before the detector that let through only the first or second laser beam. The optical filters are arranged in a manually operable or motor-driven filter wheel or filter slide that brings the individual optical filters into the beam path of the reception beam. A disadvantage is that two laser beams with different beam divergences are required to adjust the measuring of the distance from the target object. To create the different beam divergences, several beam paths and beam shaping optics are required, which increase the space requirement.

DE 10 2013 205 589 A1 discloses another known device for optically measuring the distance from a reflective target consisting of a distance measuring device and an adjustment device which is located outside the distance measuring device. The distance measuring device comprises a beam source, a detector, and a beam shaping system with a transmission optical system and a reception optical system. The adjustment device comprises at least one laser beam shaping element that can be arranged in the beam path of the laser beam and is designed as a scattering optics. To be able to adjust the laser beam to different distance ranges from reflective target objects, a plurality of laser beam shaping elements designed as scattering optics are provided that differ from each other in their scattering properties. In a further development, the adjustment device comprises at least one reception beam shaping element that can be arranged in the beam path of the reception beam and is formed as a scattering plate. With the aid of the scattering plate the reception beam can be attenuated to prevent overdriving of the detector. To be able to adapt the reception beam to different distance ranges from reflective targets, multiple reception beam shaping elements designed as scattering plates are provided that differ from each other in their light-scattering properties.

The known device for optically measuring the distance from a reflective target object has the disadvantage that extraneous light, for example in the form of direct or indirect sunlight, can raise the measurement error in distance measurement with a fixed measuring time and thereby degrade the accuracy of the measurement results or raise the measurement time necessary for the distance measurement. In contrast to the laser beam, extraneous light is not directed but can come in from different directions. The reception beam shaping elements designed as scattering plates attenuate extraneous light much more weakly than the directed reception beam. When surface retroreflectors are used, the known device for optical distance measurement has further disadvantages due to the beam expansion caused by the scattering optics. If the surface retroreflector is not arranged perpendicular to the optical axis of the incident laser beam, the minimum distance is not measured on the optical axis of the laser beam and the distance measured by the distance measuring device has a deviation from the actual distance. This deviation increases the more the laser beam is expanded by the scattering optics.

The object of the present invention is to develop a device for optically measuring the distance from a reflective target object that is suitable for measuring the distance from individual retroreflectors and surface retroreflectors. In addition, extraneous light should be attenuated in the device at low equipment expense.

According to the invention, the device for optically measuring the distance from a reflective target object is characterized by the laser beam shaping element being designed as a transmission-aperture array with a first array of transmission pixels, wherein the transmission pixels are switchable by means of a first control unit between a transmission state impermeable to the laser beam and a transmission state at least partially permeable to the laser beam. A laser beam shaping element designed as a transmission aperture array with a first array of switchable transmission pixels is suitable both for optically measuring the distance from individual retroreflectors and optically measuring the distance from surface retroreflectors. The transmission pixels of the first array are switchable independent of each other between an impermeable and an at least partially permeable transmission state, where the permeability of the transmission pixels relates at least to the wavelength range around the wavelength of the laser beam. The permeability of the transmission pixels is indicated by the transmission degree, defined as the ratio of the radiant power allowed through to the incident radiant power.

The laser beam can be adapted to the type of target object (scattering target object, individual retroreflector or surface retroreflector) through the transmission degree of the individual transmission pixels of the first array. With target objects, a distinction is made between scattering and reflective target objects, with reflective target objects being further distinguished between individual retroreflectors and surface retroreflectors. Reflective target objects are defined as individual retroreflectors that consist of a triple prism, with the dimensions of the prism being greater than the typical laser beam diameter and an incident laser beam striking a surface of the triple prism. Examples of individual retroreflectors are triple prisms with diameters of 25 mm or 50 mm. Reflective target objects are defined as surface retroreflectors that consist of a plurality of prisms arranged next to each other in a surface, where the dimensions of the prisms are smaller than the typical laser beam diameters and an incident laser beam strikes multiple prisms. Examples of surface retroreflectors are reflective films and cat's eyes.

The radiant power of the emitted laser beam is designed for measuring the distance from scattering target objects. With scattering target objects the laser beam is scattered at the target object over a large angle area; only a small part of the radiant power is registered by the reception optical system and forwarded to the detector. With measuring the distance from reflective target objects, the laser beam is reflected at the target object and strikes the detector as a directed reception beam. To prevent overdriving of the detector in measuring the distance from reflective target objects, the radiant power of the incident reception beam must be much less than the radiant power of the emitted laser beam. The reduction of the radiant power can occur through measures in the path of the laser beam and/or measures in the path of the reception beam.

With an individual retroreflector, a large part of the laser beam is hidden by the invention's transmission aperture array and the part allowed through is expanded by diffraction. The expansion can reduce the required accuracy with which the laser beam must be oriented to the individual retroreflector. In individual retroreflectors the center of the reflector should be hit by the laser beam so that the reflected reception beam is registered by the detector. If the laser beam does not hit the center of the individual retroreflector, the reflected reception beam can miss the reception optical system due to parallel offset and thus miss the detector. With a surface retroreflector, the laser beam is shaped and homogenized by the invention's transmission aperture array mainly in the edge area.

Preferably, the transmission pixels are switchable between a transmission state impermeable to the laser beam, a transmission state partially permeable to the laser beam, and a transmission state fully permeable to the laser beam. The shape of the laser beam behind the transmission aperture array can be set through the transmission degree of the individual transmission pixels. An impermeable transmission pixel has a transmission degree of less than 10%, a fully permeable transmission pixel a transmission degree of greater than 90%, and a partially permeable transmission pixel a transmission degree between 10% and 90%. In the parts of the laser beam to be hidden, the transmission pixels are switched to the impermeable transmission state. In the other parts of the laser beam the transmission pixels are switched in the partially permeable transmission state or the fully permeable transmission state. With partially permeable transmission pixels, the proportion of radiant power allowed through can be changed through the transmission degree of the transmission pixels. The smaller the transmission degree, the more the laser beam is attenuated. The transmission degree of the transmission pixels can be set in several discrete steps or without steps between 0% and 100%. A transmission degree that can be set in multiple discrete steps has the advantage of faster adjustability of the transmission degree and low electronics expense relative to a transmission degree adjustable without steps. A transmission degree adjustable without steps has the advantage that the permeability of the transmission pixels can be set very precisely.

In a preferred further development of the device according to the invention, at least one preset first transmission pixel array of the first array is provided in the first control unit, where in the first transmission pixel array at least 50% of the transmission pixels of the first array arranged in the path of the laser beam are designed as impermeable to the laser beam. For calculating the proportion of transmission pixels, only the transmission pixels of the first array are considered that are at least partly struck by the laser beam. A first array in which at least 50% of the transmission pixels are designed as impermeable to the laser beam is suitable for optically measuring the distance from individual retroreflectors. A large part of the laser beam is hidden by at least 50% of the transmission pixels being impermeable. The transmission pixels arranged in the path of the laser beam and partly or fully permeable can form a transmission aperture for the laser beam and achieve the desired strong expansion of the laser beam. The opening angle of the laser beam behind the transmission aperture array is set through the dimensions of the transmission aperture.

Particularly preferably, one transmission pixel or a plurality of adjacent transmission pixels of the first array for the laser beam form a transmission aperture, with the transmission aperture forming a partial beam and the partial beam expanding to one or more opening angles that are not smaller than a minimum critical angle of 1.0 mrad. The minimum critical angle of 1.0 mrad for the opening angle of the laser beam is defined for the measuring of the distance from individual retroreflectors and can be converted to a maximum dimension for the transmission aperture. This maximum dimension for the transmission aperture may not be exceeded if the opening angle of the partial beam is to be greater than the minimum critical angle of 1.0 mrad. The smaller the dimensions of the transmission aperture, the larger the opening angles of the partial beam in the beam path behind the transmission aperture. The minimum critical angle of 1.0 mrad assures a strong expansion of the laser beam when individual retroreflectors are used.

A transmission aperture is characterized by its surface area and its dimensions. The aperture geometry of the transmission aperture determines whether the partial beam has one opening angle or multiple opening angles. Transmission apertures with a square transmission geometry are defined by one dimension (side length of the square) and create partial beams behind the transmission aperture having a circular beam cross-section with an opening angle constant in the circumferential direction. Transmission apertures with a rectangular aperture geometry are defined by two dimensions (short and long rectangle sides) and generate partial beams behind the transmission aperture having an elliptical beam cross-section with an opening angle varying in the circumferential direction, with the opening angle varying in the circumferential direction between a maximum opening angle on the large semi-axis and a minimum opening angle on the small semi-axis of the elliptical beam cross-section. Transmission apertures with a random aperture geometry create partial beams behind the transmission aperture with multiple opening angles that lie between a minimum opening angle and a maximum opening angle.

Particularly preferably, the first array has multiple transmission apertures, with the transmission apertures creating multiple partial beams and each of the partial beams expanding to one or more opening angles that are not smaller than the minimum critical angle of 1.0 mrad. By using multiple transmission apertures, the required accuracy in the orientation of the laser beam can be reduced to one individual retroreflector. Behind the transmission aperture the partial beam first has a small beam diameter that in the near range of a few meters behind the transmission aperture array would necessitate an exact orientation of the laser beam to the individual retroreflector. Given multiple transmission apertures, the diameters of the partial beams add together and enlarge the beam diameter. A central transmission aperture is suitable, for example, as transmission aperture array for the measuring of the distance from individual retroreflectors that is arranged coaxial to the optical axis of the laser beam before the transmission aperture array, with a ring-shaped distribution of other transmission apertures around the central transmission apertures. The partial beams that create the multiple transmission apertures and overlap each other behind the transmission aperture array to a laser beam should have the same opening angle, preferably an opening angle constant in the circumferential direction. The transmission apertures preferably have the same aperture geometry and the same dimensions.

The reduction of the radiant power of the incident reception beam necessary with one individual retroreflector can happen through the transmission apertures. The radiant power of the laser beam can be adjusted through the transmission surface of the transmission aperture array and through the permeability of the transmission apertures. The transmission surface of a transmission aperture array is generally defined as the sum of the individual surface areas of the transmission apertures. If the transmission apertures have the same dimensions, the transmission surface can also be calculated as the product of the number of transmission apertures and the surface area of the transmission apertures. Alternatively or in addition to the transmission surface, the radiant power of the laser beam can be adjusted through the permeability of the transmission apertures. The permeability of the transmission apertures influences only the radiant power of the laser beam, whereas the transmission surface, which depends on the dimensions of the transmission apertures, changes the radiant power and opening angles of the partial beams. The permeability of the transmission apertures creates the possibility to adjust the radiant power of the laser beam without changing the opening angles of the partial beams.

In a preferred further development of the device according to the invention, in the first control unit at least one preset second transmission pixel array of the first array is provided, where in the second transmission pixel array at least 50% of the transmission pixels of the first array arranged in the path of the laser beam are designed as partly or fully permeable to the laser beam. For the calculation of the share of transmission pixels only the transmission pixels of the first array are considered that are at least partly struck by the laser beam. A first array in which at least 50% of the transmission pixels are designed partially or fully permeable to the laser beam is suitable for optically measuring the distance from surface retroreflectors. The transmission pixels arranged in the path of the laser beam and designed as partially or fully permeable can form a shaping aperture for the laser beam.

A shaping aperture is characterized by its surface area and its dimensions. The aperture geometry of the shaping aperture determines whether the shaped laser beam has one opening angle or multiple opening angles. Shaping apertures with a square aperture geometry are defined by the side length of the square and create laser beams having a circular beam cross-section with an opening angle constant in the circumferential direction. Shaping apertures with a rectangular aperture geometry are defined for the short and long rectangle sides and create laser beams having an elliptical beam cross-section with an opening angle varying in the circumferential direction, with the opening angle of the elliptical laser beam varying in the circumferential direction between a maximum opening angle on the large semi-axis and a minimum opening angle on the small semi-axis of the elliptical beam cross-section. Shaping apertures with a random aperture geometry create laser beams behind the shaping aperture with multiple opening angles that lie between a minimum opening angle and a maximum opening angle.

Particularly preferred, the partial or fully permeable transmission pixels of the first array form a shaping aperture where the shaping aperture converts the laser beam into a shaped laser beam with one or more opening angles and the opening angles are smaller than a maximum critical angle of 0.3 mrad. The maximum critical angle of 0.3 mrad for the laser beam's opening angle is defined for the measuring of the distance from surface retroreflectors and can be converted to a minimum dimension for the shaping aperture. The maximum critical angle of 0.3 mrad assures that a homogenization of the laser beam takes place in the measuring of the distance from surface retroreflectors and there is no strong expansion of the laser beam as is provided for the measuring of the distance from individual retroreflectors.

In a preferred embodiment, in the first control unit at least one preset first transmission pixel array and at least one preset second transmission pixel array are provided. A device according to the invention having at least one preset first transmission pixel array and at least one preset second transmission pixel array is suitable for optical measuring the distance from individual retroreflectors and surface retroreflectors. The preset first transmission pixel array is designed for measuring the distance from individual retroreflectors and the preset second transmission pixel array for measuring the distance from surface retroreflectors. Use of multiple preset transmission pixel arrays of the first array enables adjustment of the laser beam shaping element to different distance ranges in which a reflective target object is arranged, to different types of reflective target objects (individual or surface retroreflector), and to different sizes of reflective target objects. For measuring the distance from individual retroreflectors the minimum critical angle of 1.0 mrad is defined, and for measuring the distance from surface retroreflectors the maximum critical angle of 0.3 mrad. For both types of reflective target objects the opening angle of the laser beam should decline with increasing distance, i.e., in the near range large opening angles are advantageous and at greater distances small opening angles. The opening angles with individual retroreflectors are limited downward by the minimum critical angle of 1.0 mrad, and with surface retroreflectors upward by the maximum critical angle of 0.3 mrad.

In a preferred further development of the device according to the invention, a reception beam shaping element is provided that can be arranged in the reception beam's path and designed as receiving aperture array with a second array of reception pixels, where the reception pixels are switchable by means of a second control unit between a receiving state impermeable to the reception beam and a receiving state at least partly permeable to the reception beam. A reception beam shaping element designed as a receiving aperture array with a second array of switchable reception pixels is suitable for optically measuring the distance from individual retroreflectors and to surface retroreflectors. The use of a reception beam shaping element with a second array of reception pixels enables adaptation of the reception beam to the distance to the reflective target object, the type of reflective target object (individual or surface retroreflector), and the size of the reflective object. The reception pixels are switchable independent of each other between an impermeable receiving state and an at least partially permeable receiving state, where the permeability of the reception pixels relates to the wavelength range around the wavelength of the beam source. The permeability of the reception pixels is indicated through the transmission degree, defined as the ratio of the radiant power allowed through to the incident radiant power.

The reduction of the radiant power of the incident reception beam required with reflective target objects (individual retroreflector or surface retroreflector) can occur through the reception aperture array with the second array of reception pixels. The radiant power of the reception beam can be set through the reception surface of the reception aperture array and through the permeability of the reception apertures. The reception surface of a reception aperture array is generally defined as the sum of the individual surface areas of the reception apertures. If the reception apertures have the same dimensions, the reception surface can also be calculated as the product of the number of reception apertures and the surface area of the reception apertures. The smaller the ratio of the reception surface to the cross-section surface of the reception beam directly before the reception aperture array, the smaller the radiant power of the reception beam. The attenuation of the reception beam through a limitation of the reception area is independent of the wavelength of the beam source, so that extraneous light, e.g., in the form of sunlight with a broad wavelength spectrum, is attenuated. The attenuation of extraneous light occurs without additional equipment expense.

Particularly preferred are reception pixels switchable between a reception state impermeable to the reception beam, a reception state partially permeable to the reception beam, and a reception state fully permeable to the reception beam. The reception pixels of the second array are switchable independent of each other between three reception states (impermeable, partially permeable, and fully permeable), with the permeability of the reception pixels related to the wavelength range around the wavelength of the beam source. The permeability of the reception pixels of the second array, like the permeability of the transmission pixels of the first array, is indicated through the transmission degree. An impermeable reception pixel has a transmission degree less than 10%, a fully permeable reception pixel has a transmission degree greater than 90%, and a partially permeable reception pixel has a transmission degree between 10% and 90%. The transmission degree of the reception pixels can be set in multiple discrete stages or without stages between 0% and 100%. A transmission degree that can be set in multiple discrete stages has the advantage of fast ability to set the transmission degree and low electronic expense relative to a transmission degree set without stages. A transmission degree that can be set without stages has the advantage that the permeability of the reception pixels can be set very precisely.

The permeability of the reception pixels (impermeable, partially permeable, and fully permeable) is related to the wavelength range around the wavelength of the beam source, and the indicated transmission degrees between 0% and 100% apply for reception beams having the wavelength of the beam source. Besides the wavelength range around the wavelength of the beam source, other wavelength ranges can be attenuated. The use of broadband optical filters that attenuate a broad wavelength range is advantageous. The use of broadband optical filters for attenuation of the reception beam has the advantage that besides the reception beam extraneous light, such as sunlight with a broad wavelength spectrum, can be attenuated without additional effort.

Especially preferably, in the second control unit at least one preset reception pixel array of the second array can be provided, where in the reception pixel array one reception pixel or multiple adjacent reception pixels of the second array form a reception aperture for the reception beam. The reduction of the radiant power of the incident reception beam necessary with reflective target objects (individual retroreflector or surface retroreflector) can occur through the reception aperture. The radiant power of the reception beam can be set through the surface area of the reception aperture and through the permeability of the reception aperture. Attenuation of the reception beam through a restriction of the surface area of the reception aperture is dependent on the wavelength of the beam source, so that extraneous light can be attenuated without additional equipment expense.

Especially preferably, the second array has multiple reception apertures spaced apart from each other. The use of multiple reception apertures which are arranged distributed over the cross-section of the reception beam leads to a homogenization of the reception beam. A homogenization is suitable mainly for reception beams having an inhomogeneous distribution of the radiant power over the beam cross-section. The reception surface can be adjusted through the number of reception apertures and the surface area of the reception apertures.

Especially preferably, in the second control unit multiple preset reception pixel arrays of the second array are provided that at least partly differ from each other in the transmission degree of the reception pixels. The use of multiple preset reception pixel arrays of the second array enables adjustment of the reception beam shaping element to different distance ranges in which a reflective target object is arranged, to different types of reflective target objects (individual retroreflector or surface retroreflector), and to different sizes of reflective target objects. The adjustment of the reception beam shaping element to the distance range, type, and size of a reflective target object can occur through the dimensions of the reception apertures and the reception surface.

In a preferred further development of the device according to the invention, the first array of transmission pixels and the second array of reception pixels are arranged in a shared light modulator controllable by the first and second control units. The light modulator has, for example, an inner transmission area and an outer reception area, with the inner transmission area comprising the first array of transmission pixels and the outer reception area the second array of transmission pixels. A light modulator with an inner transmission area and an outer reception area is suitable for distance measurement devices having a coaxial arrangement of laser beam and reception beam.

Embodiments of the invention are described below based on the drawings. These do not necessarily represent the embodiments to scale; instead, where helpful for the explanation, the drawings are produced in schematic and/or slightly distorted form. Regarding additions to the teachings directly evident from the drawings, reference is made to the relevant prior art. It must be kept in mind that various modifications and changes to the form and detail of an embodiment can be made without deviating from the general idea of the invention. The invention's features disclosed in the description, drawings, and claims can be essential both individually and in any combination for the development of the invention. In addition, all combinations of at least two of the features described in the description, drawings, and/or claims fall within the framework of the invention. The general idea of the invention is not restricted to the exact shape or detail of the embodiments shown and described below or restricted to a subject matter that would be restricted compared to the subject matter claimed in the claims. Where dimension areas are given, values lying inside the given boundaries are also disclosed as limit values and can be used and claimed randomly. For the sake of simplicity, the same reference signs are used below for identical or similar parts or parts with identical or similar function.

DETAILED DESCRIPTION OF THE DRAWINGS

Figure 1:
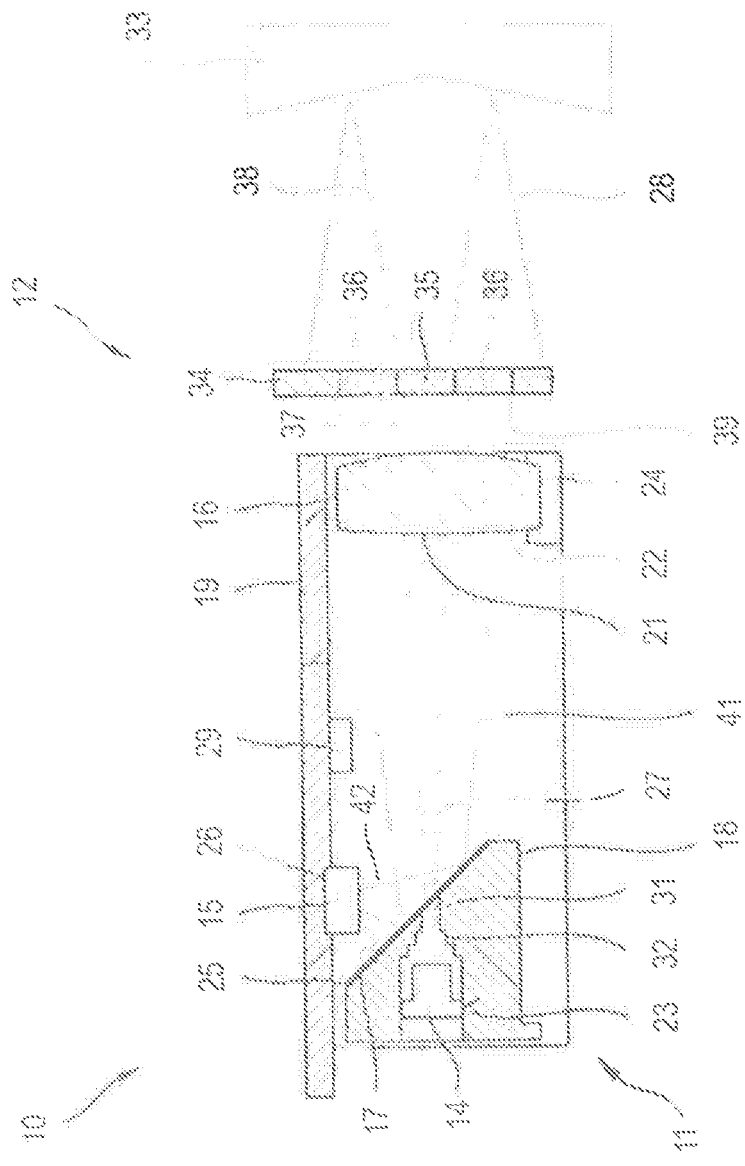
FIG. 1 illustrates a device according to the invention for optically measuring the distance from reflective target objects, consisting of a distance measuring device and an adjustment device with laser and reception beam shaping elements.

FIG. 1 shows a device according to the invention 10 for optically measuring the distance from a target object consisting of a distance measuring device 11 and an adjustment device 12 arranged outside the distance measuring device 11. With target objects a distinction is made between reflective target objects in which an incident laser beam is primarily reflected and scattering target objects in which an incident laser beam is primarily scattered.

With the reflective target objects, a distinction is additionally made between individual retroreflectors and surface retroreflectors. Reflective target objects are defined as individual retroreflectors that consist of a triple prism, with the dimensions of the prism being greater than the typical laser beam diameter, and an incident laser beam hitting a surface of the triple prism. Examples of individual retroreflectors are triple prisms with diameters of 25 mm or 50 mm. Reflective target objects are defined as surface retroreflectors that consist of a plurality of prisms arranged next to each other in a level surface, with the dimensions of the prisms being smaller than the typical laser beam diameter, and an incident laser beam striking multiple prisms. Examples of surface retroreflectors are reflective films and cat's eyes. Cat's eyes in the context of the application here are surface retroreflectors in which the ratio of the size of the prisms to the laser beam diameter is between 0.1 and 1.0, and reflective films are surface retroreflectors in which the ratio of the size of the prisms to the laser beam diameter is less than 0.1.

The distance measurement device 11 comprises a first electro-optical component designed as beam source 14, a second electro-optical component designed as detector 15, a beam shaping system 16, beam splitting optical system 17, an optics carrier 18 and a circuit board 19. The beam shaping system 16 comprises a transmission optical system 21 for shaping the laser beam and a reception optical system 22 for shaping the reception beam, integrated in a shared beam shaping optical system. The source beam 14, beam shaping optical system 16, and beam splitting optical system 17 are fastened to the optics carrier 18 and the detector 15 is fastened to the circuit board 19. The optics carrier 18 in the embodiment has a first receptacle 23 for the beam source 14, a second receptacle 24 for the beam shaping optics 16, and a third receptacle 25 for the beam splitting optical system 17. The detector 15 is fastened on the circuit board 19 in another receptacle 26.

The beam source 14 is designed as a laser diode producing a visible or infrared laser beam 27. The detector 15 is designed as a photodiode receiving a reception beam 28 reflected and/or scattered by the target object. The beam splitting optical system 17 separates the laser beam from the coaxially running reception beam; it is arranged in the path of the laser beam between the beam source 14 and the beam shaping optical system 16 and in the reception beam path between the beam shaping optical system 16 and the detector 15. The beam splitting optical system 17 can be designed, for example, as a polarization beam splitter, perforated mirror, or other beam-splitting optical element. A control and evaluation device 29 is connected with the beam source 14 and the detector 15 and determines the distance to the target object from a time difference between a reference beam and the reception beam.

An aperture 31 is arranged in the path of laser beam 27 between the beam source 14 and the beam splitting optical system 17 that is integrated into the monolithic optics carrier 18. The aperture 31 serves to limit the opening angle of the beam source 14 and adjust the geometry of the laser beam 27 to the beam splitting optical system 17 and beam shaping optical system 16. Between beam source 14 and aperture 31 is arranged a light trap 32 that, like aperture 31, is integrated into the monolithic optics carrier 18. The light trap 32 serves to absorb incident light and prevent undesired reflections. For this light trap 32 has a low-reflection, absorbent coating on the inside. The aperture 31 and light trap 32 reduce optical and electrical crosstalk from beam source 14 to detector 15.

A reflective target object designed as individual retroreflector 33 is used as target object in the embodiment of FIG. 1 that is located a short distance from the distance measurement device 11. The adjustment device 12 comprises a light modulator 34 with a laser beam shaping element 35 and a reception beam shaping element 36. The laser beam shaping element 35 comprises a first array with multiple transmission pixels and the reception beam shaping element 36 comprises a second array with multiple reception pixels. The transmission pixels form an inner transmission area and the reception pixels an outer reception area of light modulator 34.

Beam source 14 emits the laser beam 27, which is aimed at beam splitting optical system 17. The greatest possible part of the laser beam 27 is transmitted at beam splitting optical system 17 and hits transmission optical system 21, where a first beam shaping occurs. The first transmission optical system 21 is designed as a collimating lens that collimates laser beam 27 and directs it as collimated laser beam 37 to laser beam shaping element 35. The optical properties of collimating lens 21 are adapted to the distance measurement of scattering target objects. The collimated laser beam 37 hits laser beam shaping element 35, where the beam shaping and attenuation of the collimated laser beam 37 take place. The shaped laser beam 38 hits the reflective target object 33.

The reception beam 28 reflected at target object 33 hits the reception beam shaping element 36 that shapes reception beam 28, attenuates it, and directs it as shaped reception beam 39 to reception optical system 22. A further beam shaping of the shaped reception beam 39 takes place at reception optical system 22. The twice-shaped reception beam 41 is aimed at beam splitting optical system 17 and deflected at beam splitting optical system 17. The deflected reception beam 42 hits detector 15. Beam splitting optical system 17 assures that the optical axis of the deflected reception beam 42 and the optical axis of the emitted laser beam 27 differ from each other.

Figure 2A:
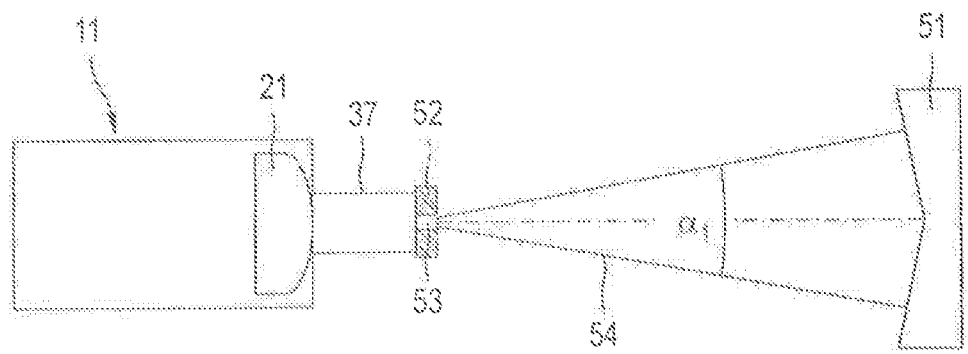
FIGS. 2A, B illustrate optically measuring the distance from an individual retroreflector with the aid of the device shown in FIG. 1, comprising a first aperture array with a transmission aperture (FIG. 2A) or a first aperture array with multiple transmission apertures (FIG. 2B)
Figure 2B:
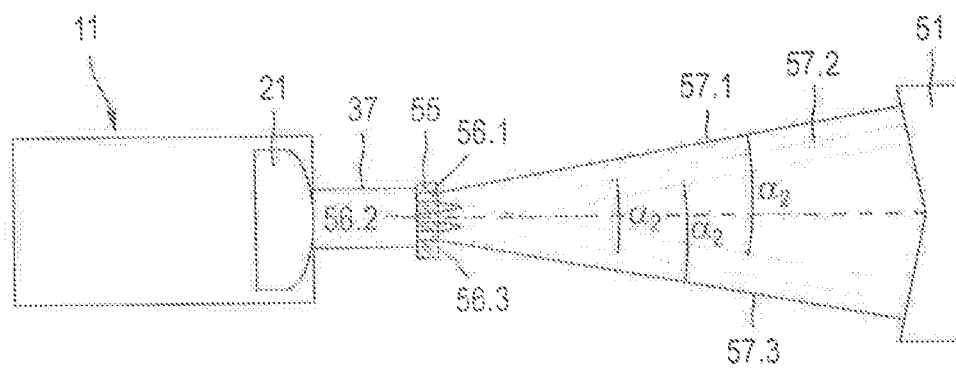

FIGS. 2A, B schematically show optically measuring the distance from an individual retroreflector 51 with the help of device 10 shown in FIG. 1. The adjustment of the laser beam to individual retroreflector 51 is done by means of a laser beam shaping element designed as transmission aperture array with a transmission aperture (FIG. 2A) or as transmission aperture array with multiple transmission apertures (FIG. 2B).

The distance measurement device 11 creates the collimated laser beam 51 with the help of transmission optical system 35. In the beam path of collimated laser beam 51 is arranged a first laser beam shaping element 52 designed for measuring the distance from individual retroreflectors. With individual retroreflectors the center of the retroreflector should be hit by the laser beam so that in each case the reflected reception beam hits the reception optical system and is registered by the detector. If the laser beam does not hit the center of the retroreflector, the reflected reception beam can miss the reception optical system due to parallel offset. To reduce the accuracy with which the laser beam must be aimed at the individual retroreflector, the laser beam is widened.

The first laser beam shaping element 52 is designed as a first transmission aperture array with a first transmission aperture 53. First transmission aperture 53 has a circular aperture geometry with a circle radius (half circle diameter). The first transmission aperture 53 creates a partial beam 54 and widens partial beam 54 to a first opening angle $\alpha_1$ that is greater than a minimum critical angle $\alpha_{min}$ of 1.0 mrad.

The first opening angle $\alpha_1$ of partial beam 54 can be set through the circle radius of the first transmission aperture 53; the smaller the circle radius of the first transmission aperture 53, the larger the first opening angle $\alpha_1$ of partial beam 54. The first transmission aperture 53 also causes the radiant power of the laser beam to be greatly reduced.

A transmission aperture is characterized by its surface area and dimensions. The minimum critical angle $\alpha_{min}$ of 1.0 mrad can be converted to a maximum dimension for the transmission aperture that the transmission aperture may not go below. The aperture geometry of the transmission aperture determines whether the partial beam has one opening angle or multiple opening angles. Transmission apertures with a circular or square aperture geometry are defined by the dimension (circle radius, side length of the square) and create behind the transmission aperture partial beams having a circular beam cross-section with an opening angle constant in the circumferential direction. Transmission apertures with an elliptical or rectangular aperture geometry are defined by two dimensions and create behind the transmission aperture partial beams having an elliptical beam cross-section with an opening angle varying in the circumferential direction, with the opening angle in the circumferential direction varying between a maximum opening angle on the large half-axis and a minimum opening angle on the small half-axis of the elliptical beam cross-section. Transmission apertures with a random aperture geometry create behind the transmission aperture partial beams with multiple opening angles that lie between a minimum opening angle and a maximum opening angle.

After the first transmission aperture 53 the partial beam 54 initially has a small beam diameter that in the close range would necessitate an exact orientation of partial beam 54 to individual retroreflector 51. To reduce the required accuracy with which partial beam 54 must be directed at individual retroreflector 51, the second laser beam shaping element 55 shown in FIG. 2B can be used. Second laser beam shaping element 55 is designed as a second transmission aperture array with multiple second transmission apertures 56.1, 56.2, 56.3. The second transmission apertures 56.1-56.3 each create a partial beam 57.1, 57.2, 57.3 and widen the partial beams 57.1-57.3 to a second opening angle $\alpha_2$, which is greater than the minimum critical angle $\alpha_{min}$ of 1.0 mrad. Examples of a suitable arrangement of the second transmission apertures 56.1-56.3 are a central second transmission aperture arranged coaxial to the optical axis of collimated laser beam 37 and a ring-shaped distribution of further second transmission apertures around the central second transmission aperture. The second opening angle $\alpha_2$ of the partial beams can be set through the circle radius of the second transmission apertures 56.1-56.3; the smaller the circle radius of the second transmission apertures 56.1-56.3, the greater the second opening angle $\alpha_2$ of the partial beam.

The radiant power of the laser beam after the transmission aperture array can be adjusted through the transmission surface of the transmission aperture array and the permeability of the transmission apertures. The transmission surface of a transmission aperture array is generally defined as the sum of the individual surface areas of the transmission apertures. If the transmission apertures have the same dimensions, the transmission area can also be calculated as the product of the number of transmission apertures and the surface area of the transmission apertures. The smaller the ratio of the transmission area to the cross-section area of the laser beam directly before the transmission aperture array, the smaller the radiant power of the transmitted portion of the laser beam after the transmission aperture array.

Figure 3:
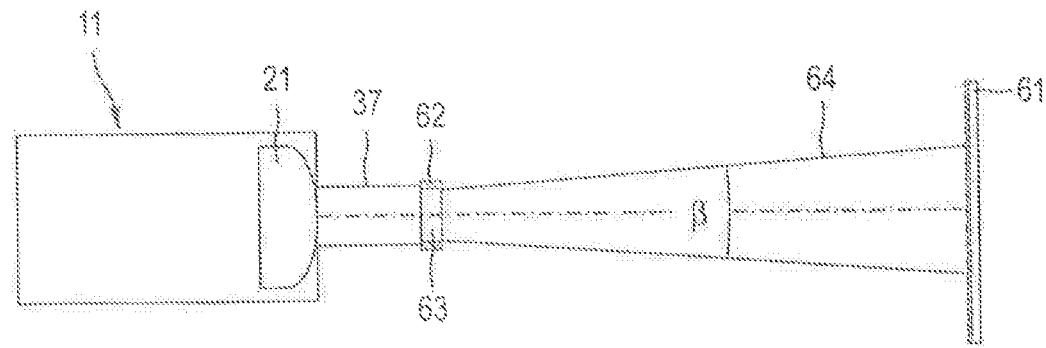
FIG. 3 illustrates optically measuring the distance from a surface retroreflector with the aid of the device shown in FIG. 1.

FIG. 3 schematically shows optically measuring the distance from a surface retroreflector 61 with the aid of the device 10 shown in FIG. 1. The distance measurement device 11 with the help of the transmission optical system creates the collimated laser beam 37. In the path of the collimated laser beam 37 is arranged a laser beam shaping element 62 designed for the measuring the distance from surface retroreflectors.

Laser beam shaping element 62 has a shaping aperture 63 with a circular aperture geometry that converts the incident laser beam with a shaped laser beam 64 with an opening angle ß, with the opening angle ß of the shaped laser beam 64 being smaller than a maximum critical angle $ß_{max}$ of 0.3 mrad. Opening angle ß of shaped laser beam 64 can be set through the circle radius of shaping aperture 63; the larger the circle radius of shaping aperture 63, the smaller the opening angle ß of shaped laser beam 64.

A shaping aperture is characterized by its surface area and its dimensions. The maximum critical angle $ß_{max}$ of 0.3 mrad can be converted to a minimum dimension for the shaping aperture that the shaping aperture may not go below. The aperture geometry of the shaping aperture determines whether the shaped laser beam has one opening angle or multiple opening angles. Shaping apertures with a circular or square aperture geometry are defined by one dimension (circle radius, side length of the square) and create laser beams having a circular beam cross-section with an opening angle constant in the circumferential direction. Shaping apertures with an elliptical or rectangular aperture geometry are defined by two dimensions and create laser beams having an elliptical beam cross-section with an opening angle varying in the circumferential direction, with the opening angle of the elliptical laser beam in the circumferential direction varying between a maximum opening angle on the large half-axis and a minimum opening angle on the small half-axis of the elliptical beam cross-section. Shaping apertures with a random aperture geometry create after the shaping aperture laser beams with multiple opening angles that lie between a minimum opening angle and a maximum opening angle.

Figure 4:
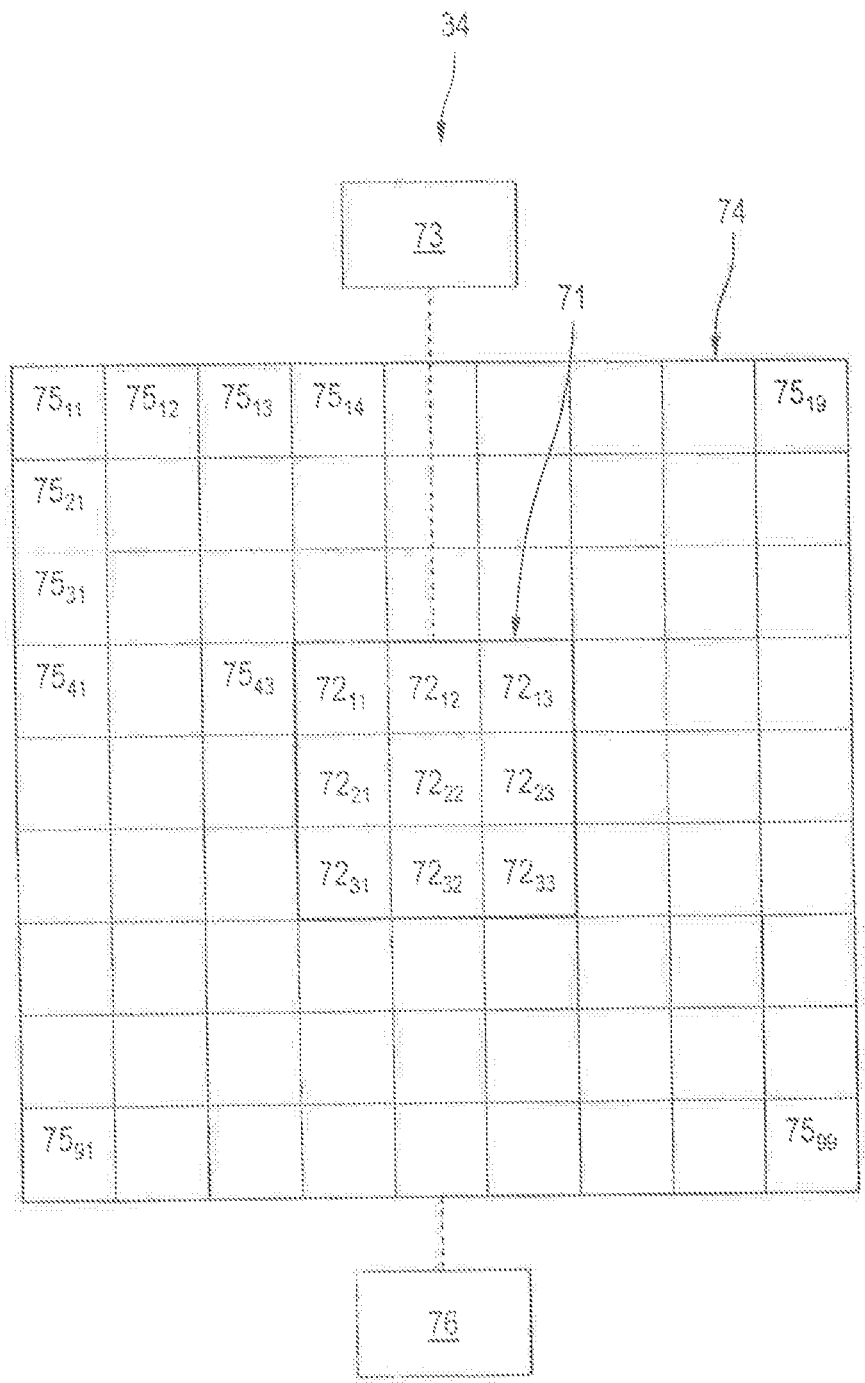
FIG. 4 illustrates an embodiment of the adjustment device designed as light modulator with a first array of multiple transmission pixels and a second array of multiple reception pixels.

FIG. 4 shows the light modulator 34 of FIG. 1 with laser beam shaping element 35 and reception beam shaping element 36 in detail. Laser beam shaping element 35 forms an inner transmission area and reception beam shaping element 36 an outer reception area of light modulator 34.

Laser beam shaping element 35 is designed as a transmission aperture array with a first array 71 of nine transmission pixels $72_{ij}$ with i, j=1, 2, 3, arranged in three rows and three columns. The position of a transmission pixel $72_{ij}$ in the first array 71 is established through a first index i that indicates the row in first array 71 and a second index j that indicates the column in first array 71. Transmission pixels $72_{ij}$ are switchable by means of a first control unit 73 between a first transmission state impermeable to the laser beam, a second transmission state partially permeable to the laser beam, and a third transmission state fully permeable to the laser beam. The permeability of transmission pixels $72_{ij}$ is indicated through a transmission degree $TS_{ij}$, defined as the ratio of transmitted radiant power to incident radiant power of the laser beam.

The transmission degrees $TS_{ij}$, i, j=1, 2, 3 of transmission pixels $72_{ij}$ can be set independently by means of first control unit 73 for each transmission pixel $72_{ij}$. In the first transmission state of a transmission pixel $72_{ij}$ the transmission degree $TS_{ij}$ is less than 10% ($TS_{ij}$<10%), and the transmission pixel $72_{ij}$ is designed as impermeable to the laser beam. In the second transmission state of a transmission pixel $72_{ij}$ the transmission degree $TS_{ij}$ is between 10% and 90% (10%≤$TS_{ij}$≤90%), and transmission pixel $72_{ij}$ is designed as partially permeable to the laser beam. In the third transmission state of a transmission pixel $72_{ij}$ the transmission degree $TS_{ij}$ is designed as greater than 90% (90%<$TS_{ij}$) and transmission pixel $72_{ij}$ is fully permeable to the laser beam.

Reception beam shaping element 36 is designed as a reception aperture array with a second array 74 of 72 reception pixels $75_{kl}$ with k, l=1 to 9, arranged in nine rows and nine columns. Reception pixels $75_{kl}$ with k, l=4, 5, 6 are not designed as reception pixels but populated by the nine transmission pixels $72_{ij}$ of first array 71. The reception pixels $75_{kl}$ are adjustable by means of a second control unit 76 between a first reception state impermeable to the reception beam, a second reception state partially permeable to the reception beam, and a third reception state fully permeable to the reception beam. The permeability of reception pixels $75_{kl}$ of second array 74 is indicated analogous to the transmission pixels $72_{ij}$ of the first array 71 through a transmission degree $TE_{kl}$, defined as the ratio of transmitted radiant power to incident radiant power of the reception beam.

The transmission degrees $TE_{kl}$, k, l=1 to 9 of reception pixels 75r are adjustable by means of the second control unit 76 for each reception pixel $75_{kl}$. In the first reception state of a reception pixel $75_{kl}$ the transmission degree $TE_{kl}$ is less than 10% ($TE_{kl}$<10%), and the reception pixel $75_{kl}$ is designed as impermeable to the reception beam. In the second reception state of a reception pixel $75_{kl}$ the transmission degree $TE_{kl}$ is between 10% and 90% (10%≤$TE_{kl}$≤90%), and reception pixel $75_{kl}$ is designed as partially permeable to the reception beam. In the third reception state of a reception pixel 751 the degree of transmission $TE_{kl}$ is greater than 90% (90%<$TE_{kl}$) and the reception pixel $75_{kl}$ is designed as fully permeable to the reception beam.

The permeability of the transmission and reception pixels (impermeable, partially permeable, and fully permeable) relates to the wavelength range around the wavelength of the beam source and the indicated transmission degrees $TS_{ij}$ and $TE_{kl}$ between 0% and 100% apply for laser and reception beams having the wavelength of the beam source. Besides the wavelength range around the wavelength of the beam source, other wavelength ranges can be attenuated. Use of broadband optical filters that attenuate a broad wavelength range is advantageous, above all for the reception beam shaping element 36. The use of broadband optical filters for attenuating the reception beam has the advantage that besides the reception beam extraneous light, such as sunlight with a broad wavelength spectrum, can also be attenuated without additional effort.

The necessary size of laser beam shaping element 35 is essentially established by the beam cross-section of the collimated laser beam 37. In the embodiment of FIG. 2 the first array 71 comprises nine transmission pixels $72_{ij}$, arranged in a 3×3 array. The transmission pixels $72_{ij}$ are designed as square and have the same size. Alternatively, transmission pixels $72_{ij}$ can have another shape or differ from each other in size; for example, the transmission pixels can be designed as hexagonal or have a smaller size in the area of the optical axis than transmission pixels spaced farther from the optical axis. The larger the number of transmission pixels, the smaller the pixel area of the individual transmission pixels and the more detailed the beam shaping of the collimated laser beam 37 can be.

Figure 5A:
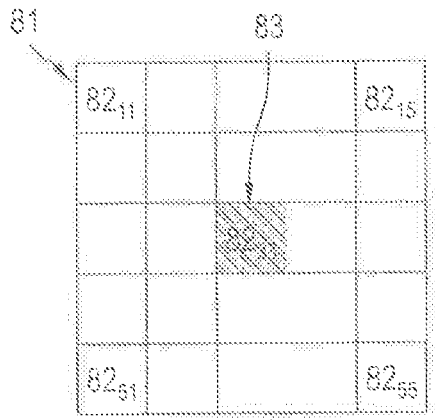
FIGS. 5A, B illustrate two preset first transmission pixel arrays of an alternative first array of 25 transmission pixels for measuring the distance from individual retroreflectors in different distance ranges to the target objects.

FIGS. 5A, B show two preset first transmission pixel arrays of a first rate 81 of 25 transmission pixels $82_{ij}$ with i, j=1 to 5, arranged in five rows and five columns, for measuring the distance from individual retroreflectors. The first transmission pixel array shown in FIG. 5A is provided for distance measurements in a first distance range and the first transmission pixel array shown in FIG. 5B is provided for the distance measurements in a second distance range.

The first array 81 can replace first array 71 of light modulator 34. The first arrays 71, 81 differ in the number of transmission pixels and/or the dimensions of the transmission pixels. Otherwise the method of operation of the first arrays 71, 81 is the same. The transmission pixels $82_{ij}$ of first array 81 are switchable by means of first control unit 73 between the impermeable first transmission state, the partially permeable second transmission state, and the fully permeable third transmission state. The transmission degrees $TS_{ij}$ of transmission pixel $82_{ij}$ can be set independent of each other. The position of a transmission pixel $82_{ij}$ in first array 81 is established through a first index i that indicates the row in first array 81 and a second index j that indicates the column in first array 81.

In the first transmission pixel array shown in FIG. 5A the transmission pixel $82_{33}$ for the laser beam is switched fully permeable and the other 24 transmission pixels are switched impermeable to the laser beam. The transmission pixel $82_{33}$ forms a transmission aperture 83 for the laser beam that creates a partial beam and widens the partial beam to an opening angle $\alpha_1$ that is not smaller than the minimum critical angle $\alpha_{min}$ of 1.0 mrad. The transmission aperture 83 has a square aperture geometry and creates after the transmission aperture 83 a partial beam with a circular beam cross-section and the opening angle $\alpha_1$ constant in the circumferential direction.

Figure 5B:
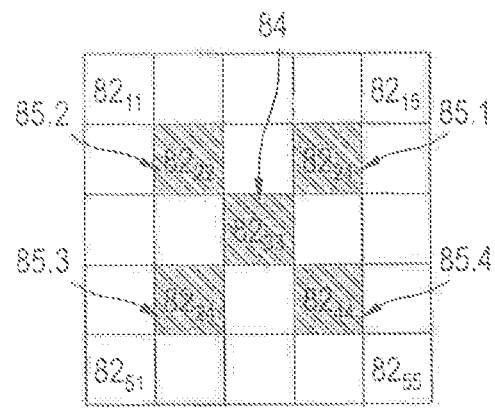

In the first transmission pixel array shown in FIG. 5B the transmission pixels $82_{22}$, $82_{24}$, $82_{33}$, $82_{42}$, $82_{44}$ are switched fully permeable to the laser beam and the other 20 transmission pixels are switched impermeable to the laser beam. The five transmission pixels $82_{33}$, $82_{22}$, $82_{24}$, $82_{42}$, $82_{44}$ form five transmission apertures 84, 85.1, 85.2, 85.3, 85.4, which create five partial beams and the partial beams each expand to an opening angle $\alpha_2$ that is not smaller than the minimum critical angle $\alpha_{min}$ of 1.0 mrad. The transmission aperture 84 forms a central transmission aperture and the other transmission apertures 85.1-85.4 are arranged around the central transmission aperture 84. The transmission apertures 84, 85.1-85.4 have a square aperture geometry and create after the transmission apertures 84, 85.1-85.4 partial beams with a circular beam cross-section and the opening angle $\alpha_2$ constant in the circumferential direction. Since the dimensions of the transmission apertures 84, 85.1-85.4 are the same, the opening angles $\alpha_2$ of the partial beams match.

Figure 6A:
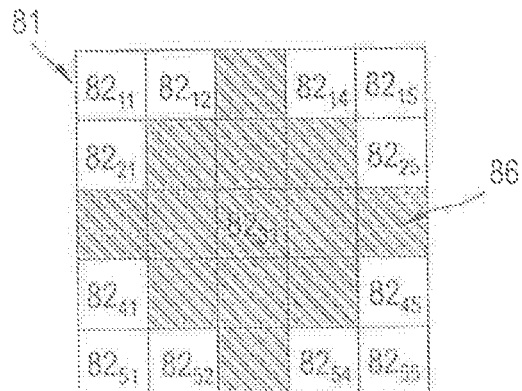
FIGS. 6A, B illustrate two preset second transmission pixel arrays of the first array of 25 transmission pixels for measuring the distance from surface retroreflectors in different distance ranges to the target object.

FIGS. 6A, B show two preset second transmission pixel arrays of the 25 transmission pixels $82_{ij}$ with i, j=1 to 5 of the first array 81 for the measuring the distance from surface retroreflectors. The second transmission pixel array shown in FIG. 6A is provided for distance measurements in a first distance range and the second transmission pixel array shown in FIG. 6B is provided for distance measurements in a second distance range.

In the second transmission pixel array shown in FIG. 6A the transmission pixels $82_{11}$, $82_{12}$, $82_{14}$, $82_{15}$, $82_{21}$, $82_{25}$, $82_{41}$, $82_{45}$, $82_{51}$, $82_{52}$, $82_{54}$, $82_{55}$ are switched impermeable to the laser beam and the transmission pixels $82_{13}$, $82_{22}$, $82_{23}$, $82_{24}$, $82_{31}$, $82_{32}$, $82_{33}$, $82_{34}$, $82_{35}$, $82_{42}$, $82_{43}$, $82_{44}$, $82_{53}$ are switched fully permeable to the laser beam. The transmission pixels switched fully permeable form for the laser beam a shaping aperture 86 that homogenizes the incident laser beam and converts it into a shaped laser beam with multiple opening angles ß1 that are smaller than the maximum critical angle $ß_{max}$ of 0.3 mrad.

The transmission pixel $82_{33}$ forms the center point of the shaping aperture 86 and the first array 81 is positioned such that the optical axis of the collimated laser beam 37 coincides with the center point of the shaping aperture 86. The dimensions of the shaping aperture 86 starting from center point $82_{33}$ in the positive and negative horizontal direction (along the rows of array 81) and in the positive and negative vertical direction (along the columns of array 81) match. The aperture geometry of the shaping aperture 86 determines whether the shaped laser beam has one opening angle or multiple opening angles. A shaping aperture with a square aperture geometry creates a laser beam with a circular beam cross-section and an opening angle constant in the circumferential direction of the laser beam. Shaping aperture 86, comprised of the 13 square transmission pixels $82_{13}$, $82_{22}$, $82_{23}$, $82_{24}$, $82_{31}$, $82_{32}$, $82_{33}$, $82_{34}$, $82_{35}$, $82_{42}$, $82_{43}$, $82_{44}$, $82_{53}$, differs from the ideal square aperture geometry and creates behind the shaping aperture 86 a laser beam with multiple opening angles. All opening angles $ß_1$ of the shaped laser beam are smaller than the maximum critical angle $ß_{max}$ of 0.3 mrad.

Figure 6B:
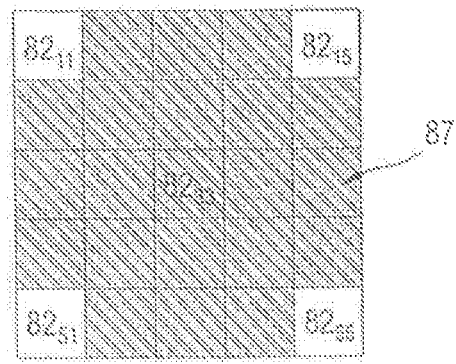

In the second transmission pixel array shown in FIG. 6B the transmission pixels $82_{11}$, $82_{15}$, $82_{51}$, $82_{55}$ are switched impermeable to the laser beam and the other 21 transmission pixels $82_{12}$, $82_{13}$, $82_{14}$, $82_{21}$, $82_{22}$, $82_{23}$, $82_{24}$, $82_{25}$, $82_{31}$, $82_{32}$, $82_{33}$, $82_{34}$, $82_{35}$, $82_{41}$, $82_{42}$, $82_{43}$, $82_{44}$, $82_{45}$, $82_{52}$, $82_{53}$, $82_{54}$ are switched fully permeable to the laser beam. The transmission pixels switched fully permeable form for the laser beam a shaping aperture 87 that homogenizes the incident laser beam and converts it to a shaped laser beam with multiple opening angles $ß_2$ that are smaller than the maximum critical angle $ß_{max}$ of 0.3 mrad.

Figure 7A:
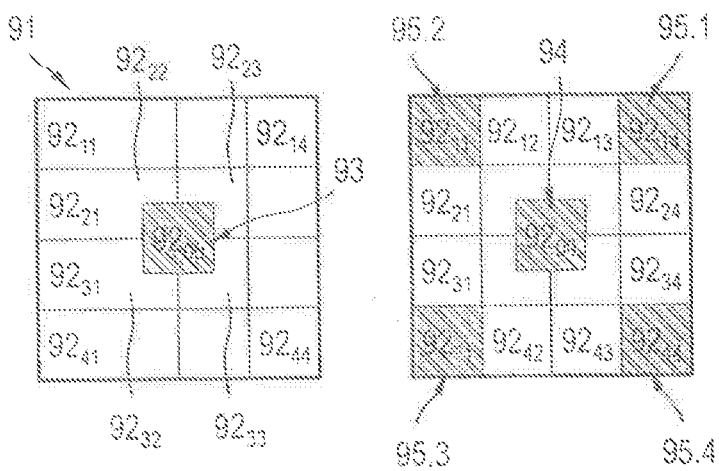
FIGS. 7A-C illustrate three preset first transmission pixel arrays of a first array of 17 transmission pixels for measuring the distance from individual retroreflectors in three different distance ranges to the target object.
Figure 7B:
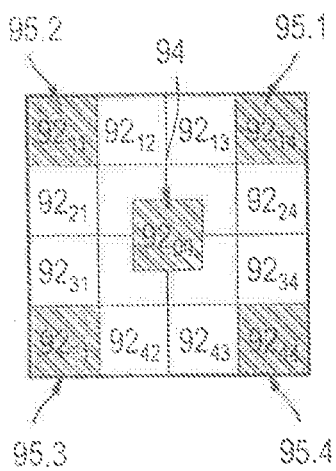
Figure 7C:
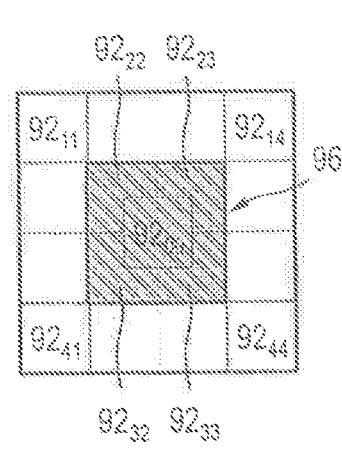

FIGS. 7A-C show three preset first transmission pixel arrays of a first array 91 of 17 transmission pixels $92_{ij}$ with i, j=0 and i, j=1 to 4 for the measuring the distance from individual retroreflectors in three different distance ranges.

The transmission pixel $92_{00}$ as the central transmission pixel is surrounded by four non-square transmission pixels $92i$ with i, j=2, 3, with the four non-square transmission pixels forming a quadrangular ring. The four non-square transmission pixels $92_{22}$, $92_{23}$, $92_{32}$, $92_{33}$ are surrounded by 12 transmission pixels $92_{ij}$ with i=1, 4 and j=1 4 as well as i=2, 3 and j=1, 4. The first array 91 can replace the first array 71 of light modulator 34. The first arrays 71, 91 differ in the number of transmission pixels, the dimensions of the transmission pixels and/or the geometry of the transmission pixels; otherwise, the method of operation of the first arrays 71, 91 is the same.

In the transmission pixel array shown in FIG. 7A the central transmission pixel $92_{00}$ is switched fully or partly permeable to the laser beam ($TS_{ij}≥10\%$) and the other 16 transmission pixels are impermeable to the laser beam ($TS_{ij}<10\%$). The central transmission pixel $92_{00}$ for the laser beam the forms a transmission aperture 93, which creates a partial beam and widens the partial beam to an opening angle at that is not smaller than the minimum critical angle $\alpha_{min}$ of 1.0 mrad.

In the transmission pixel array shown in FIG. 7B the central transmission pixel $92_{00}$ and the four transmission pixels $92_{ij}$ are arranged in the corners of the square array 81, with i, j=1, 4 switched fully or partially permeable to the laser beam ($TS_{ij}≥10\%$) and the other 12 transmission pixels are switched impermeable to the laser beam ($TS_{ij}<10\%$). The five transmission pixels $92_{00}$, $92_{11}$, $92_{14}$, $92_{44}$, $92_{41}$ form five transmission arrays 94, 95.1, 95.2, 95.3, 95.4, which create five partial beams and expand each of the partial beams to an opening angle $\alpha_1$ that is not smaller than the minimum critical angle $\alpha_{min}$ of 1.0 mrad. Since the dimensions of the transmission apertures 94, 95.1-95.4 are the same, the opening angles $\alpha_1$ of the partial beams match.

In the transmission pixel array shown in FIG. 7C the central transmission pixel $92_{00}$ and the four non-square transmission pixels $92_{ij}$ with i, j=2, 3 are switched fully or partly permeable to the laser beam ($TS_{ij} \geq 10\%$) and the other 12 transmission pixels are switched impermeable to the laser beam ($TS_{ij} < 10\%$). The five transmission pixels $92_{00}$, $92_{22}$, $92_{28}$, $92_{32}$, $92_{33}$ form a transmission aperture 96, which creates a partial beam and widens the partial beam to an opening angle $\alpha_2$ that is not smaller than the minimum critical angle $\alpha_{min}$ of 1.0 mrad. The dimensions of the transmission aperture 96 are twice as great as the dimensions of transmission aperture 93 and the transmission pixel array shown in FIG. 7A, and the opening angle $\alpha_2$ that the transmission aperture 96 creates is smaller than the opening angle $\alpha_1$ that the transmission aperture 93 creates.

The aperture geometry of the transmission apertures 93, 94, 95.1-95.4, 96 determines whether the partial beams have one opening angle or multiple opening angles. The transmission pixel $92_{00}$ forms the center point of the transmission apertures 93, 94, 96, and the first array 91 is positioned such that the optical axis of the collimated laser beam 37 coincides with the center point of the transmission apertures 93, 94, 96. The transmission apertures 93, 94, 95.1-95.4, 96 have a square aperture geometry and create partial beams behind the transmission apertures having a circular beam cross-section with an opening angle constant in the circumferential direction.

Figure 8A:
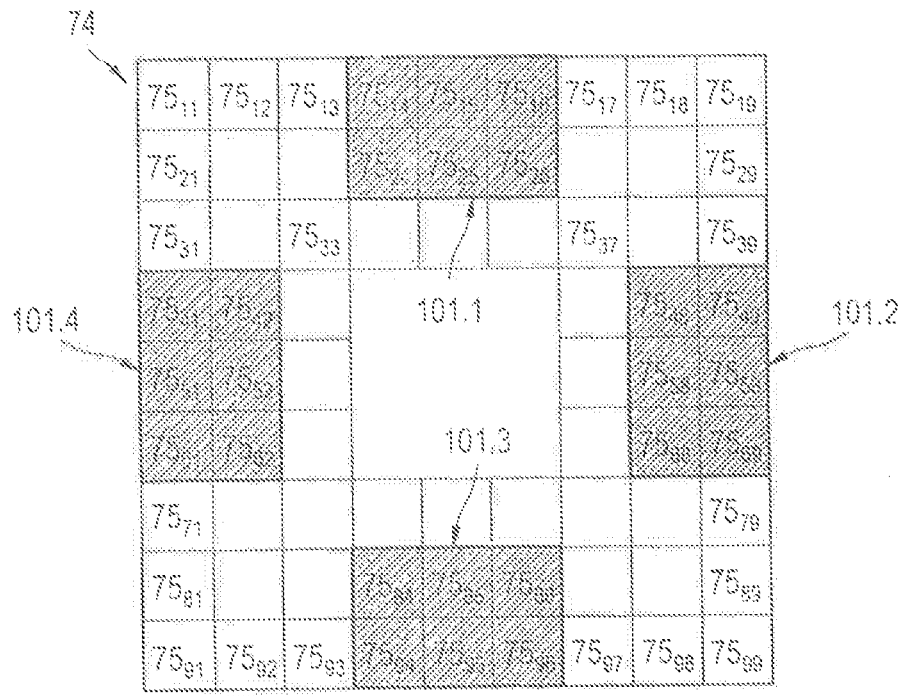
FIGS. 8A, B illustrate two preset reception pixel arrays of the second array of reception pixels of FIG. 4 for the optical distance measurement in different distance ranges to the target object.

FIGS. 8A, B show two preset reception pixel arrays for the two arrays 74 of reception pixels $75_{kl}$ shown in FIG. 4. The reception pixels $75_{kl}$ are switchable by means of the second control unit 76 between an impermeable reception state ($TE_{kl} < 10\%$), a partially permeable reception state ($10\% \leq TE_{kl} \leq 90\%$), and a fully permeable reception state ($90\% < TE_{kl}$). The transmission degrees $TE_{kl}$ can relate to the wavelength range around the wavelength of the beam source 14 or a broad wavelength range containing the wavelength of the beam source 14.

In the reception pixel arrays shown in FIG. 8A six adjacent reception pixels each forms a reception aperture for the reception beam. The reception pixels $75_{kl}$, i=1, 2 and j=4 to 6 form a first reception aperture 101.1, the reception pixels $75_{kl}$, i=4 to 6 and j=8, 9 form a second reception aperture 101.2, the reception pixels $75_{kl}$, i=8, 9 and j=4 to 6 form a third reception aperture 101.3, and the reception pixels $75_{kl}$, i=4 to 6 and j=1, 2 form a fourth reception aperture 101.4.

Figure 8B:
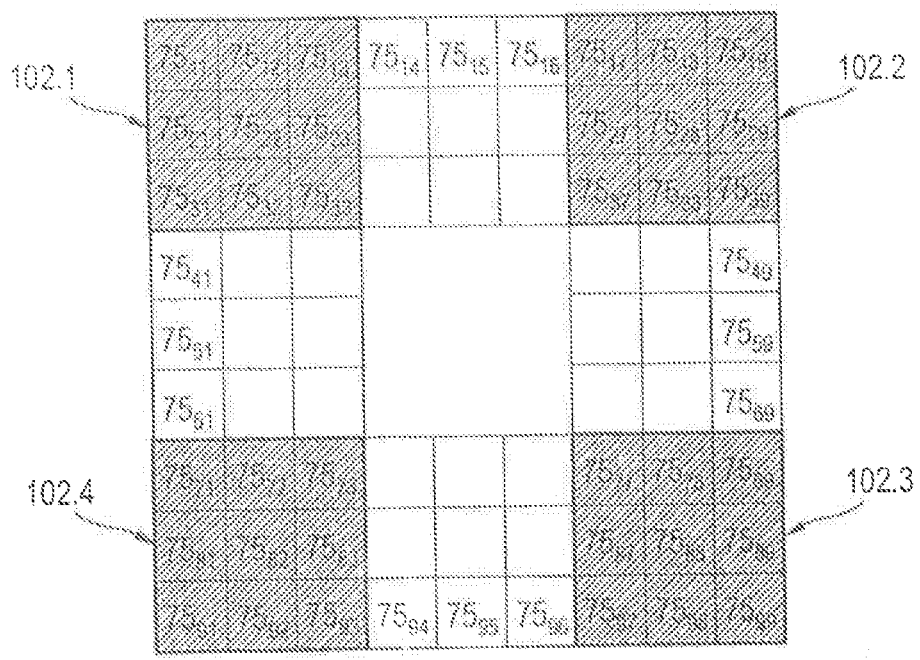

In the reception pixel arrays shown in FIG. 8B nine adjacent reception pixels arranged in three rows and three columns each form a reception aperture for the reception beam. The reception pixels $75_{kl}$, i, j=1 to 3 form a first reception aperture 102.1, the reception pixels $75_{kl}$, i=1 to 3 and j=7 to 9 form a second reception aperture 102.2, the reception pixels $75_{kl}$, i=j=7 to 9 form a third reception aperture 102.3, and the reception pixels $75_{kl}$, i=7 to 9 and j=1 to 3 form a fourth reception aperture 102.4.

The reception pixels $75_{kl}$ of the reception apertures 101.1-101.4, 102.1-102.4 can be switched fully permeable ($90\% < TE_{kl}$) or partially permeable ($10\% \leq TE_{kl} \leq 90\%$). Through the transmission degree $TE_{kl}$ of the reception pixels $75_{kl}$ the radiant power of the reception beam can be adjusted. The smaller the transmission degree $TE_{kl}$ is set, the lower the radiant power of the reception beam hitting the detector 15.

The transmission degree of the reception pixels $75_{kl}$ can be set in multiple discrete stages or without stages between 0% and 100%. A transmission degree adjustable in multiple discrete stages has the advantage of fast adjustability of the transmission degree and a low electronic expense relative to a transmission degree adjustable without stages. A transmission degree $TE_{kl}$ adjustable without stages has the advantage that the permeability of the reception pixels $75_{kl}$ can be set very accurately.

The invention claimed is:

1. A device for optically measuring a distance from a reflective target object, which is embodied as an individual retroreflector, and for optically measuring a distance from a reflective target object, which is embodied as a surface retroreflector, comprising:
   a beam source, wherein the beam source is a first electro-optical component and wherein the beam source emits a laser beam;
   a detector, wherein the detector is a second electro-optical component and wherein the detector receives a reception beam reflected or scattered at the reflective target object;
   a beam shaping system with a transmission optical system that shapes the laser beam and a reception optical system that shapes the reception beam; and
   a laser beam shaping element, wherein the laser beam shaping element is disposable in a path of the laser beam, wherein the laser beam shaping element is a transmission aperture array with a first array of transmission pixels, and wherein the transmission pixels are switchable by a first control unit between a transmission state impermeable to the laser beam having a transmission degree less than 10%, a transmission state partially permeable to the laser beam having a transmission degree between 10% and 90%, and a transmission state fully permeable to the laser beam having a transmission degree greater than 90%;
   wherein in the first control unit at least one preset first transmission pixel array and at least one preset second transmission pixel array are provided;
   wherein in the at least one preset first transmission pixel array at least 50% of the transmission pixels of the first array disposed in the path of the laser beam are impermeable to the laser beam;
   wherein in the at least one preset second transmission pixel array at least 50% of the transmission pixels of the first array disposed in the path of the laser beam are partially permeable or fully permeable to the laser beam.

2. The device according to claim 1, wherein one transmission pixel or multiple adjacent transmission pixels of the first array form a transmission aperture for the laser beam wherein the transmission aperture creates a partial beam and the partial beam expands to one or more opening angles that are not smaller than a minimum critical angle of 1.0 mrad.

3. The device according to claim 2, wherein the first array has multiple transmission apertures, wherein the multiple transmission apertures create multiple partial beams, and wherein the multiple partial beams each expand to one or more opening angles that are not smaller than the minimum critical angle of 1.0 mrad.

4. The device according to claim 1, wherein the partially permeable or the fully permeable transmission pixels of the first array form a shaping aperture, wherein the shaping aperture converts the laser beam to a shaped laser beam with one or more opening angles and the one or more opening angles are smaller than a maximum critical angle of 0.3 mrad.

5. The device according to claim 1 further comprising a reception beam shaping element, wherein the reception beam shaping element is disposable in a path of the reception beam, wherein the reception beam shaping element is a reception aperture array with a second array of reception pixels, and wherein the reception pixels are switchable by a second control unit between a reception state impermeable to the reception beam and a reception state at least partially permeable to the reception beam.

6. The device according to claim 5, wherein the reception pixels are switchable between a reception state partially permeable to the reception beam and a reception state fully permeable to the reception beam.

7. The device according to claim 5, wherein in the second control unit at least one preset reception pixel array of the second array is provided and wherein in the at least one preset reception pixel array one reception pixel or multiple adjacent reception pixels of the second array form a reception aperture for the reception beam.

8. The device according to claim 7, wherein the second array has multiple reception apertures spaced apart from each other.

9. The device according to claim 7, wherein in the second control unit multiple preset reception pixel arrays of the second array are provided that differ from each other at least partially in a transmission degree of the reception pixels.

10. The device according to claim 5, wherein the first array of transmission pixels and the second array of reception pixels are arranged in a shared light modulator.

* * * * *